(12) United States Patent
Kim

(10) Patent No.: US 6,637,831 B1
(45) Date of Patent: Oct. 28, 2003

(54) WHEEL COVER FOR AUTOMOBILES

(76) Inventor: Kwang-Tai Kim, 101 Dong, 901 Ho. Cheonggu 3 Cha Apt, No. 360-2, Junggye-Dong, Nowon-Gu, Seoul (KR)

( * ) Notice: Subject to any disclaimer, the term of this patent is extended or adjusted under 35 U.S.C. 154(b) by 0 days.

(21) Appl. No.: 10/187,451

(22) Filed: Jul. 2, 2002

(51) Int. Cl.[7] .................................................. B60B 7/20
(52) U.S. Cl. ................................ 301/37.25; 301/37.109
(58) Field of Search ........................... 301/37.25, 37.26, 301/37.27, 37.102, 37.108, 37.109

(56) References Cited

U.S. PATENT DOCUMENTS

| | | | |
|---|---|---|---|
| 1,515,419 A | * | 11/1924 | Smith |
| 2,707,131 A | * | 4/1955 | Sundberg |
| 2,954,629 A | * | 10/1960 | Matin |
| 5,016,944 A | * | 5/1991 | Schultz .................... 301/37.25 |
| 5,190,354 A | * | 3/1993 | Levy et al. .............. 301/37.25 |
| 5,957,542 A | * | 9/1999 | Boothe et al. ........... 301/37.25 |
| 6,045,195 A | * | 4/2000 | Okamoto ............... 301/37.101 |
| 6,443,529 B1 | * | 9/2002 | Williams ................. 301/37.25 |

* cited by examiner

*Primary Examiner*—Russell D. Stormer
(74) *Attorney, Agent, or Firm*—Harrison & Egbert

(57) ABSTRACT

A wheel cover having an emblem plate for automobiles wherein the emblem plate is designed such that it is maintained at an upright position regardless of a rotation of the remaining part of the wheel cover along with the wheels of an automobile. The wheel cover includes a central depression formed at the center of the wheel cover, with a bearing mounted at the center of the rear surface of the depression. An emblem plate is rotatably set in the central depression such that the rotating shaft is inserted into the bearing. A balance weight is attached to the lower portion of the rear surface of the emblem plate. A rotor is rotatably mounted to the center of the rear surface of the weight. This rotor thus almost completely prevents a rotation of the emblem plate. The wheel cover of this invention allows observers to clearly recognize the emblem, symbol, message or figure formed on the emblem plate during rotation of the wheels.

1 Claim, 7 Drawing Sheets

WHEEL COVER FOR AUTOMOBILES

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

1. Field of the Invention

The present invention relates, in general, to wheel covers for automobiles and, more particularly, to a wheel cover for automobiles, the emblem part of which is separated from the remaining part of the wheel cover, with a balance weight provided in the emblem part for maintaining the emblem part at an upright position regardless of a rotation of the remaining part of the wheel cover, thus allowing the emblem or symbol formed on the emblem part to be more clearly recognized by observers.

2. Background of the Invention

As shown in FIG. 1, conventional wheel covers 100 for automobiles are designed such that they are externally and detachably attached to the central portions of the wheels of an automobile so as to finish the appearance of the wheels mounted with tires 200. Each of the conventional wheel covers 100 is an integrated body, with an emblem part 300 provided at the central portion of the wheel cover 100 and typically marked with the emblem or symbol of a wheel cover's manufacturer. The conventional wheel covers 100 having such an integrated structure are rotated at a high speed along with the wheels when the automobile runs along a street as shown in FIG. 2. Since the conventional wheel covers 100 are rotated at a high speed along with the wheels, it is almost impossible for observers to recognize the emblem or symbol formed on the wheel covers 100 during rotation of the wheels.

BRIEF SUMMARY OF THE INVENTION

Accordingly, the present invention has been made keeping in mind the above problems occurring in the prior art, and an object of the present invention is to provide a wheel cover for automobiles, in which the emblem part marked with the emblem or symbol of a wheel cover's manufacturer or another advertising message or figure is separated from the remaining part of the wheel cover, and is provided with a balance weight capable of maintaining the emblem part at an upright position regardless of a rotation of the remaining part of the wheel cover, thus allowing observers to clearly recognize the emblem, symbol, message or figure formed on the emblem part during rotation of the wheels.

In order to accomplish the above objects, the present invention provides a wheel cover for automobiles, comprising: a central depression formed at the center of the wheel cover, with a bearing mounted at the center of the rear surface of the depression; an emblem plate having a rotating shaft at the center of its rear surface and rotatably set in the central depression such that the rotating shaft is inserted into the bearing, the emblem plate also having an emblem sheet on its front surface; a balance weight made of a heavy material and attached to the lower portion of the rear surface of the emblem plate; a rotor rotatably mounted to the center of the rear surface of the weight such that the rotating angle of the rotor is limited within a range of about 40° by two stop pins provided on the rear surface of the weight, the rotor thus almost completely preventing a rotation of the emblem plate; and a protective cap covering the emblem plate so as to protect the emblem sheet from external damage.

BRIEF DESCRIPTION OF THE SEVERAL VIEWS OF THE DRAWINGS

The above and other objects, features and other advantages of the present invention will be more clearly understood from the following detailed description taken in conjunction with the accompanying drawings.

DETAILED DESCRIPTION OF THE INVENTION

Figure 1:
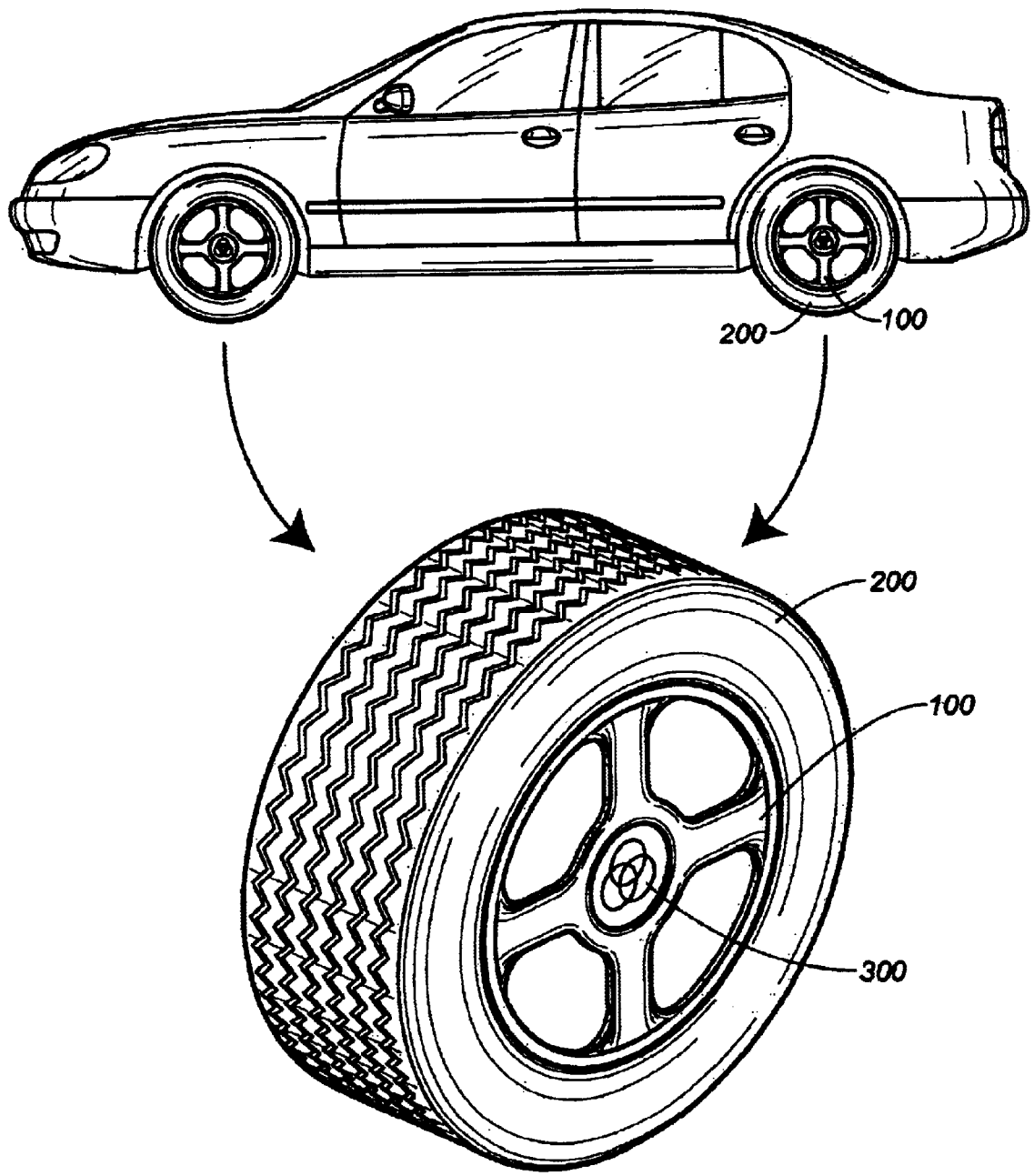
FIG. 1 is a side view of an automobile, the wheels of which are covered with conventional wheel covers.
Figure 2:
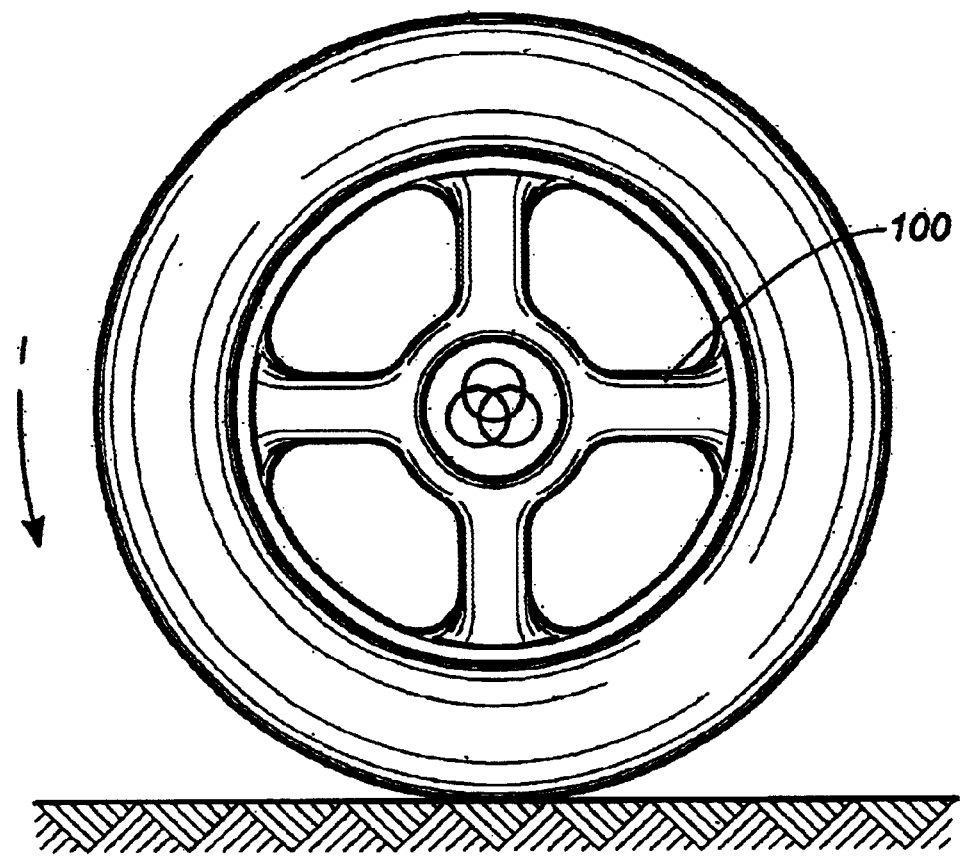
FIG. 2 is a front view of a rotating wheel of the automobile, with the conventional wheel cover having an integrated structure rotated along with the wheel.

Reference should now be made to the drawings, in which the same reference numerals are used throughout the different drawings to designate the same or similar components.

Figure 3:
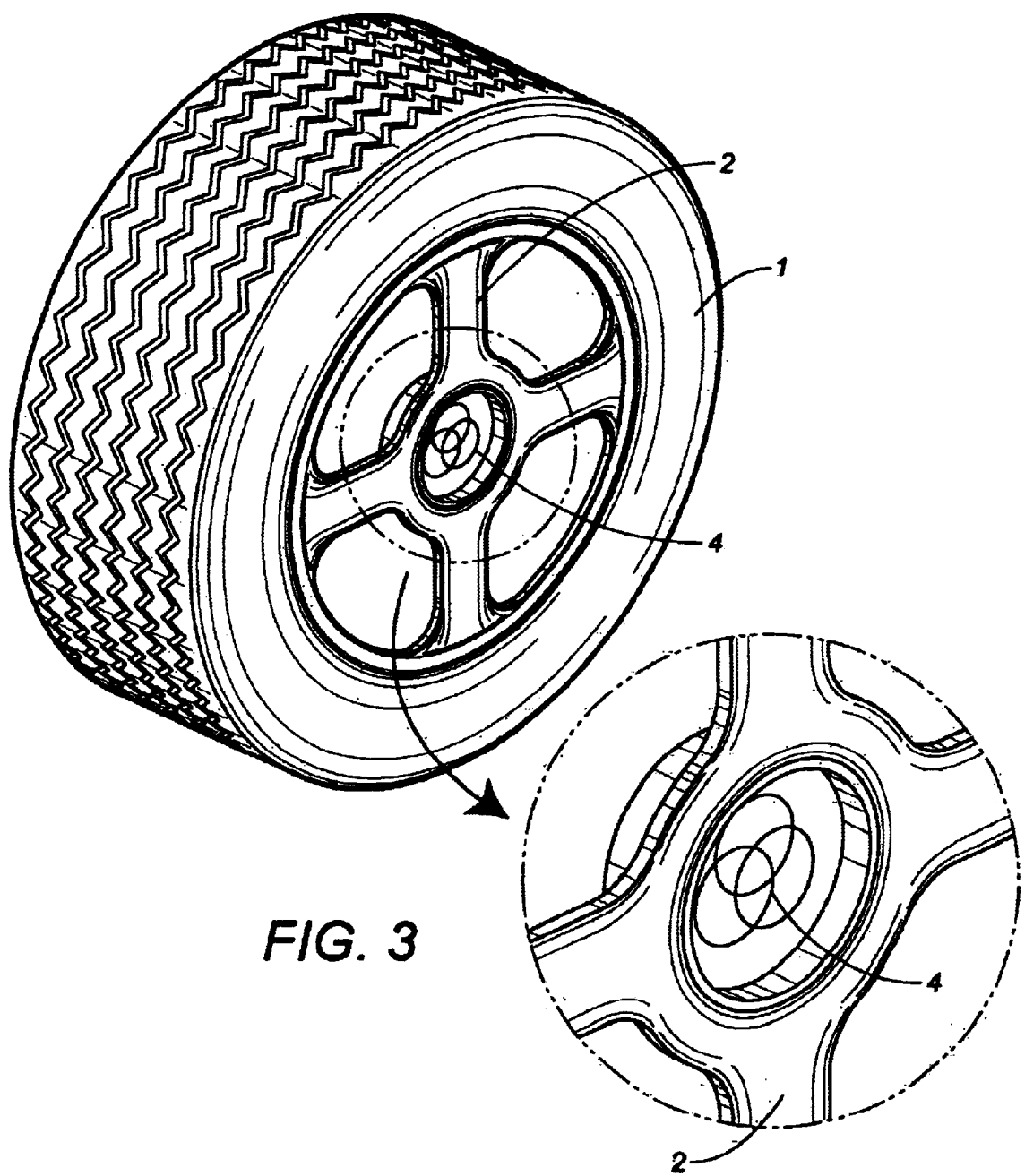
FIG. 3 is a perspective view of a wheel of an automobile covered with a wheel cover in accordance with the preferred embodiment of the present invention.
Figure 4:
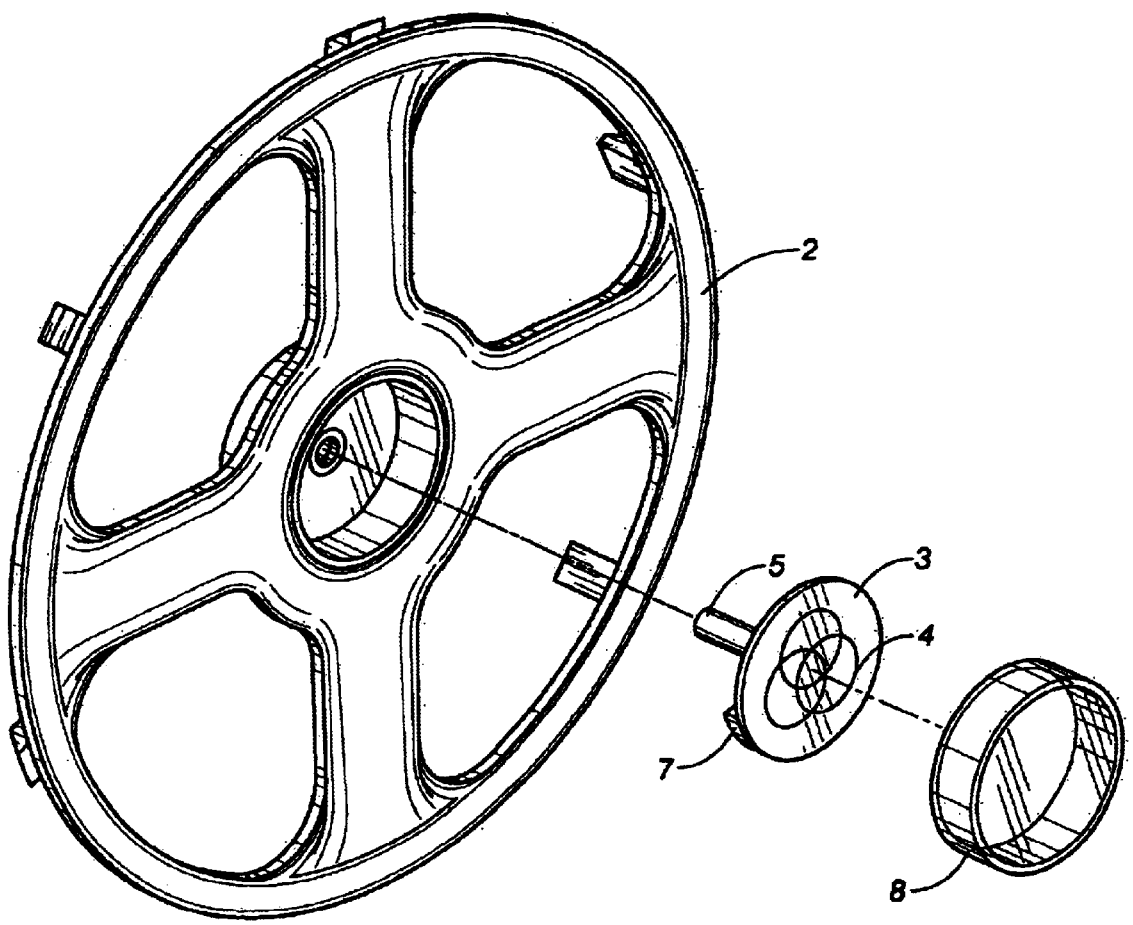
FIG. 4 is an exploded perspective view, showing the construction of the wheel cover of this invention.
Figure 5:
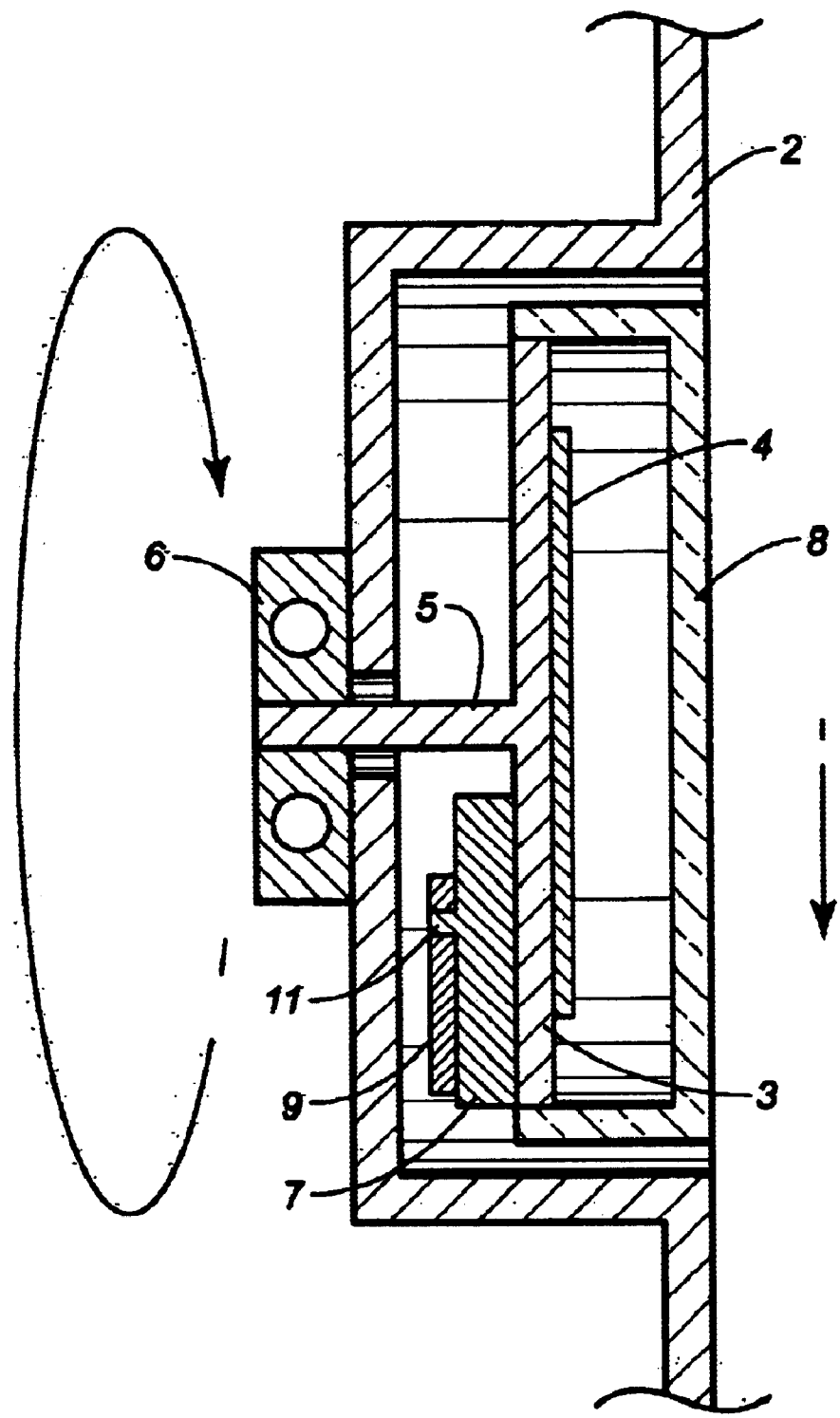
FIG. 5 is a sectional view of the wheel cover according to this invention when the parts of the wheel cover are assembled into a single structure.
Figure 6:
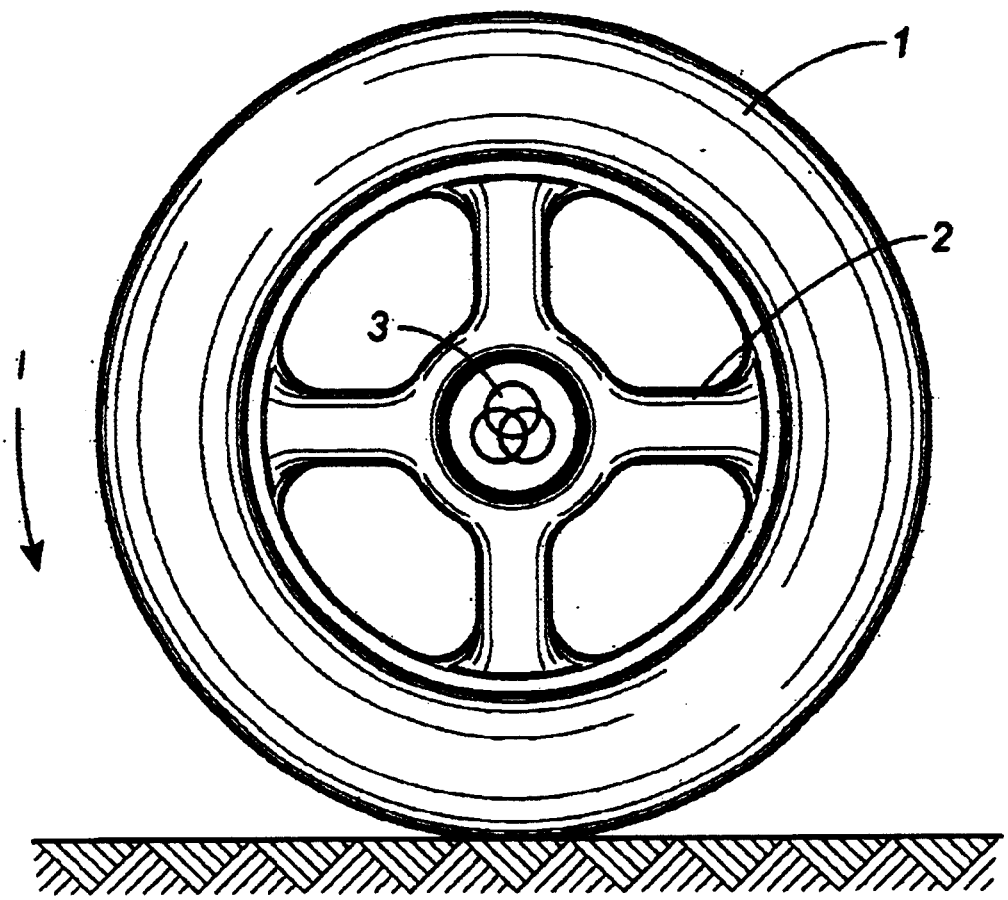
FIG. 6 is a front plan view of the wheel covered with the wheel cover according to this invention, showing an emblem plate of the wheel cover maintained at an upright position regardless of a rotation of the wheel.
Figure 7:
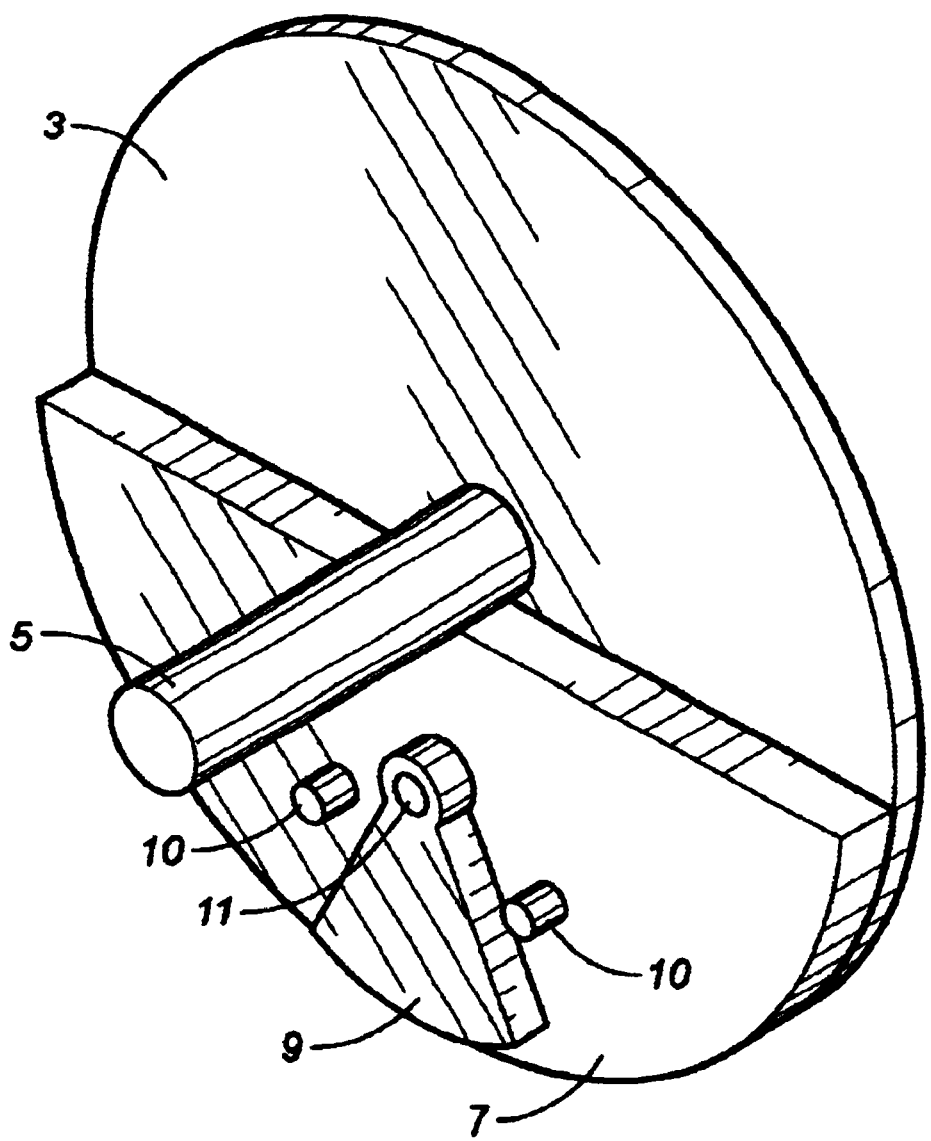
FIG. 7 is a rear perspective view of the emblem plate included in the wheel cover of this invention, with a balance weight and a rotor provided at the lower portion of the rear surface of the wheel cover.

FIG. 3 is a perspective view of a wheel of an automobile covered with a wheel cover in accordance with the preferred embodiment of the present invention. FIG. 4 is an exploded perspective view, showing the construction of the wheel cover of this invention. FIG. 5 is a sectional view of the wheel cover when the parts of the wheel cover are assembled into a single structure. FIG. 6 is a front view of the wheel covered with the wheel cover of this invention, showing an emblem plate of the wheel cover maintained at an upright position regardless of a rotation of the wheel. FIG. 7 is a rear perspective view of the emblem plate, with a balance weight and a rotor provided at the lower portion of the rear surface of the wheel cover.

As is shown in the drawings, the wheel cover 2 of this invention externally and detachably attached to the central portion of an automobile's wheel having a tire 1, and comprises an emblem plate 3. This emblem plate 3 is rotatably set in the central depression of the wheel cover 2 such that the front surface of the emblem plate 3 is exposed to the outside of the wheel cover 2. In order to rotatably set the emblem plate 3 in the wheel cover 2, the emblem plate 3 has a rotating shaft 5 at the center of its rear surface, while a shaft bearing 6 is mounted at the center of the rear surface of the wheel cover 2. When the emblem plate 3 is set in the central depression of the wheel cover 2, the shaft 5 of the emblem plate 3 passes through a shaft hole formed at the bottom of the central depression of the wheel cover 2, and is inserted into the bearing 6. Attached to the front surface of the emblem plate 3 is an emblem sheet 4. A balance weight 7 made of a heavy material, such as lead, is attached to the lower portion of the rear surface of the emblem plate 3. A rotor 9 is rotatably mounted to the center of the rear surface of the weight 7 using a hinge pin 11. Two stop pins 10 are provided on the rear surface of the weight 7 at spaced positions outside the rotor 9 such that the two stop pins 10 limit the opposite directional rotating angles of the rotor 9 within a range of about 400. A protective cap 8 is fitted over the emblem plate 3 so as to protect the emblem sheet 4 from external damage.

In order to assemble the emblem plate 3 with the wheel cover 2 of this invention, the rotating shaft 5 of the emblem plate 3 passes through the shaft hole formed at the bottom of the central depression of the wheel cover 2, and is inserted into the bearing 6 mounted to the rear surface of the wheel cover 2. Even when the wheel covers 2 are rotated along with the wheels of the automobile, the emblem plates 3 may be maintained at their upright positions since they are rotatably supported by the bearings 6 at their shafts 5 and are balanced due to gravity of the balance weights 7. In addition, the rotor 9 is rotatably mounted to the rear surface of the weight 7 by the hinge pin 11 such that it is limited in its rotating angles within a range of about 40 degrees by the two stop pins 10, and so the emblem plates 3 are almost completely maintained at their upright positions.

The emblem plate 3 is covered with the transparent protective cap 8. Since the protective cap 8 is detachably attached to the emblem plate 3, it is possible for a person to easily replace the existing emblem sheet 4 with another advertising sheet after removing the cap 8 from the emblem plate 3.

As described above, the present invention provides a wheel cover having an emblem plate for automobiles. In this wheel cover, the emblem plate is designed such that it is maintained at an upright position due to a balance weight regardless of a rotation of the remaining part of the wheel cover along with the wheels of an automobile. Therefore, the wheel cover of this invention allows observers to clearly recognize the emblem, symbol, message or figure formed on the emblem plate during rotation of the wheels.

Although a preferred embodiment of the present invention has been described for illustrative purposes, those skilled in the art will appreciate that various modifications, additions and substitutions are possible, without departing from the scope and spirit of the invention as disclosed in the accompanying claims.

I claim:

1. An apparatus for a wheel of an automobile comprising:
    a wheel cover having a depression formed at a center thereof, said wheel cover having a bearing mounted at a center of a rear surface of said depression;
    an emblem plate having a rear surface within a rotating shaft at a center thereof, said emblem plate being rotatably mounted in said depression such that said rotating shaft is received in said bearing, said emblem plate having an emblem sheet on a front surface thereof;
    a balance weight formed of a heavy metal, said balance weight attached to a lower portion of said rear surface of said emblem plate;
    a rotor means rotatable mounted to a center of said rear surface of said balance weight such that a rotating angle of said rotor means is limited within a range of about 40° by stop pins affixed to said rear surface of said balance weight, said rotor means for preventing a rotation of said emblem plate; and
    a protective cap means covering the emblem plate for protecting said emblem sheet from external damage.

\* \* \* \* \*